3,474,523
METHOD OF WELDING
Giuseppe Musso, Cardrezzate, and Marcel Portal, Brebbia, Italy, assignors to European Atomic Energy Community (Euratom), Brussels, Belgium
Filed July 31, 1967, Ser. No. 657,188
Claims priority, application Belgium, Sept. 1, 1966, 32,844
Int. Cl. B23k 31/02, 31/06
U.S. Cl. 29—473.5          5 Claims

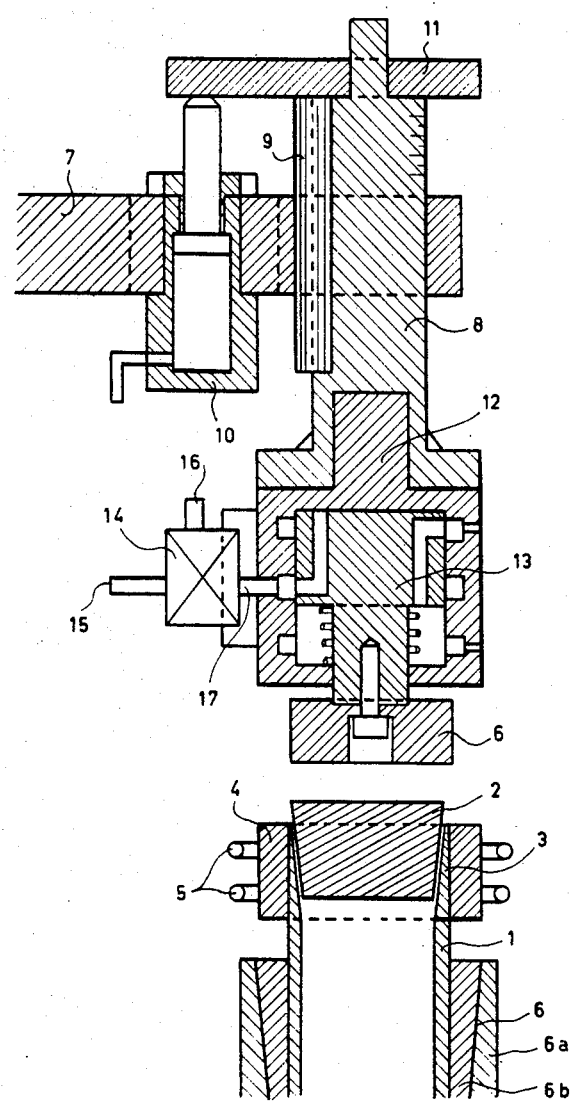

ABSTRACT OF THE DISCLOSURE

A method of welding a male sintered material into a female sintered material wherein the male member is initially placed into said female member and the members are heated to the fusion temperature, after which the male member is pushed up to the final position of welding by means of high frequency hammering.

BACKGROUND OF THE INVENTION

Field of the invention

The object of the present invention is a method of welding sintered materials such as sintered aluminum powder, or the like, to each other, or to metals.

In order to obtain a tight bond between these types of materials, especially when they are utilized in nuclear reactors having helically finned cans, or the like, the mechanical strength of the bond must be greater than that of the can portion of the reactor.

Prior art

In effecting welding between sintered materials under the condition of complete fusion of the matrix it is generally known to utilize argon-arc processes and electronic bombardment. Also, for weldings made by intermetallic diffusion, or for welding made near the melting point of the matrix, it is generally known to utilize sparking and hot circumferential hammering.

In general, these known methods involve a relatively high cost, and are difficult to apply to helically finned cans while retaining satisfactory mechanical strength.

SUMMARY OF THE INVENTION

It is therefore an object of the present invention to provide an improved method for welding sintered materials to each other or to other metals, which overcomes the disadvantages noted above.

Briefly summarized, in the method of the present invention, the contact surfaces of the parts to be joined are pressed against each other after which the parts are heated at their place of contact until the parts reach a plastic state. Vibration is then effected on the contact surfaces in a direcion which permits them to rub against each other for a period of time sufficient to permit the elimination of the surface oxide on the parts, while intimately bonding the particles of oxide in non-linear form in the direction of the weld and permitting intermetallic diffusion in plastic phase of the matrix.

BRIEF DESCRIPTION OF THE DRAWINGS

Reference is now made to the accompanying drawings for a better understanding of the nature and objects of the method of the present invention, which drawings illustrate the best mode presently contemplated for carrying out the object of the invention and its principles, and are not to be construed as restrictions or limitations on its scope. In the drawings:

FIG. 1 is a vertical sectional view depicting the parts to be welded and the apparatus utilized in the method of the present invention.

DESCRIPTION OF THE PREFERRED EMBODIMENTS

One embodiment of the method of the present invention will now be described with reference to FIG. 1, it being assumed for the purposes of illustration that it is desired to close a sintered aluminum powder can 1 by a sintered aluminum powder plug 2. At least a portion of can 1 is machined into a conical shape, as shown at 3, having a slight inclination similar to that of the tapered plug 2. A stainless steel ring 4 surrounds the terminal end of the can closely fitting its shape, and thus serves for the pre-heating of the entire weld effected by a high frequency induction heater 5.

Mandrel 6, along with backup mandrels 6a and 6b, support can 1. A column frame 7, which may be in the form of a drill frame or a frame of a mechanically moving machine, is provided to which a column 8 is mounted for translatory movement, a key 9 being provided to avoid the rotation of the assembly. A pneumatic jack 10 is mounted on frame 7 to lift the assembly during rest and to free the parts to be welded.

A head 18 of a double-acting high frequency pneumatic hammer 12 and 13 is fastened to the base of column 8, and can be adjusted in accordance with the geometry of the plug.

A three-way valve 14 may be connected to head 18 via passage 17 to free the charge and its assembly during operation or to the pneumatic jack 10 via passage 16 during the time in which the assembly is not in operation. The compressed air entering through 15 is the sole source of energy for operating the assembly.

In operation, the contact surface between plug 2 and can 1 is previously freed of grease with acetone, and the plug is placed on the can by simple pressure. Then can 1 and plug 2 are heated by the high frequency heater 5 for an average of four minutes until they attain a plastic state. The vibrating hammer 12 and 13 is then placed in operation and the jack 10 freed. The descent of the hammer takes place very rapidly until it comes in contact with the striking head on plug 2, this striking power being adjustable by use of masses 11 which may be applied to column 8 in order to control the effect of the vibration.

As a result of the above, the plug penetrates into the can down to the predetermined limit, and the welding is effected, on the average, after a few seconds of vibration.

The advantages of the method according to the invention reside primarily in the quality of the welding. The vibration increases the frictional contact of the two parts to be welded and makes it possible to intimately bond the particles of oxide in a nonlinear form in the direction of the weld. Furthermore, the present invention avoids the installation of enclosures for controlled atmosphere or vacuum.

It is clear that the method of the present invention can be advantageously utilized in other environments, such as when the installation of one of the parts to be welded cannot be maneuvered. In this case the heating can be effected by a portable source of heat, such as for instance, by an oxyacetylene torch.

Furthermore, it is possible to utilize the present invention for welding all possible shapes and dimensions of workpieces, whether they are hollow or solid. Thus, for cans or tubes having cooling fins formed on their outer surface, a ring which fits the shape of the can can be formed by directly spraying stainless steel via a metal spray gun on the part to be welded until a ring of suitable size is obtained. This ring is then ground to the dimension of the conventional ring and freed of the can which served as support for the spraying. This makes it possible to produce all welds regardless of the outer shape of the can.

For the particular case of the closing of a sintered aluminum powder can, it is possible to obtain a tight weld with a solid plug. A large welded surface guarantees a high mechanical strength, which is greater than the strength of the can. The plug can, if necessary, be modified to a predetermined shape after the welding by upsetting the material.

The method can be extended to the welding of all metals and ceramic metals and in particular for welding a part or parts having large diameters, particularly such as the cans of force provided for certain reactors.

The method of the present invention also makes it possible to effect welding in all positions, whether horizontal, vertical, or annular, and where very little space is permitted. The metal coatings which might be provided as diffusion barriers can satisfactorily withstand the welding. Also, a passage device, such as a thermocouple, can easily be introduced, either into the plug or into the can welded by the method of the present invention, without damaging the parts to be assembled. For example, thin tubes of stainless steel can be introduced into the solid sintered aluminum powder or aluminum plug.

It is to be understood that any suitable vibrator which is available in the art may be utilized in the method of the present invention, as long as it effects the necessary vibrations discussed above.

Of course, variations of the specific construction and arrangement of this type method herein disclosed can be made by those skilled in the art without departing from the invention as defined in the appended claims.

We claim:

1. A method of welding a male member to a female member, the male member having a larger outer dimension than the corresponding inner dimension of the female member, comprising the steps of pressing the contact surfaces of the male and female members against each other, heating the members in this position to the fusion temperature for each member, and pushing the male member to the final welding position by a vibrating hammer while destroying the superficial film of oxide on said members.

2. A method according to claim 1, wherein said members are in the form of a sintered aluminum powder fuel element can and a sintered aluminum powder plug closing the can at its end, and wherein the vibration is effected in the axial direction of the can by high frequency hammering.

3. A method according to claim 1, wherein said members are metal.

4. A method according to claim 1, wherein said members are ceramic metal.

5. A method according to claim 1, wherein said members are sintered.

References Cited

UNITED STATES PATENTS

| | | | |
|---|---|---|---|
| 2,807,082 | 9/1957 | Zambrow et al | 29—497.5 XR |
| 3,191,279 | 6/1965 | Ashurkoff | 29—525 XR |
| 3,197,857 | 8/1965 | Nippert | 29—484 XR |
| 3,222,767 | 12/1965 | Ashurkoff | 29—525 |
| 3,224,086 | 12/1965 | Balamuth | 29—525 |
| 3,245,138 | 4/1966 | Wilde | 29—525 XR |
| 3,302,277 | 2/1967 | Pruden et al. | 29—484 |
| 3,367,021 | 2/1968 | Beghi | 29—497.5 XR |

JOHN F. CAMPBELL, Primary Examiner

R. B. LAZARUS, Assistant Examiner

U.S. Cl. X.R.

29—473.3, 484, 497.5, 525